Sept. 13, 1949.　　　G. R. WHITNEY　　　2,481,705
FLOW REGULATOR
Filed Oct. 22, 1945
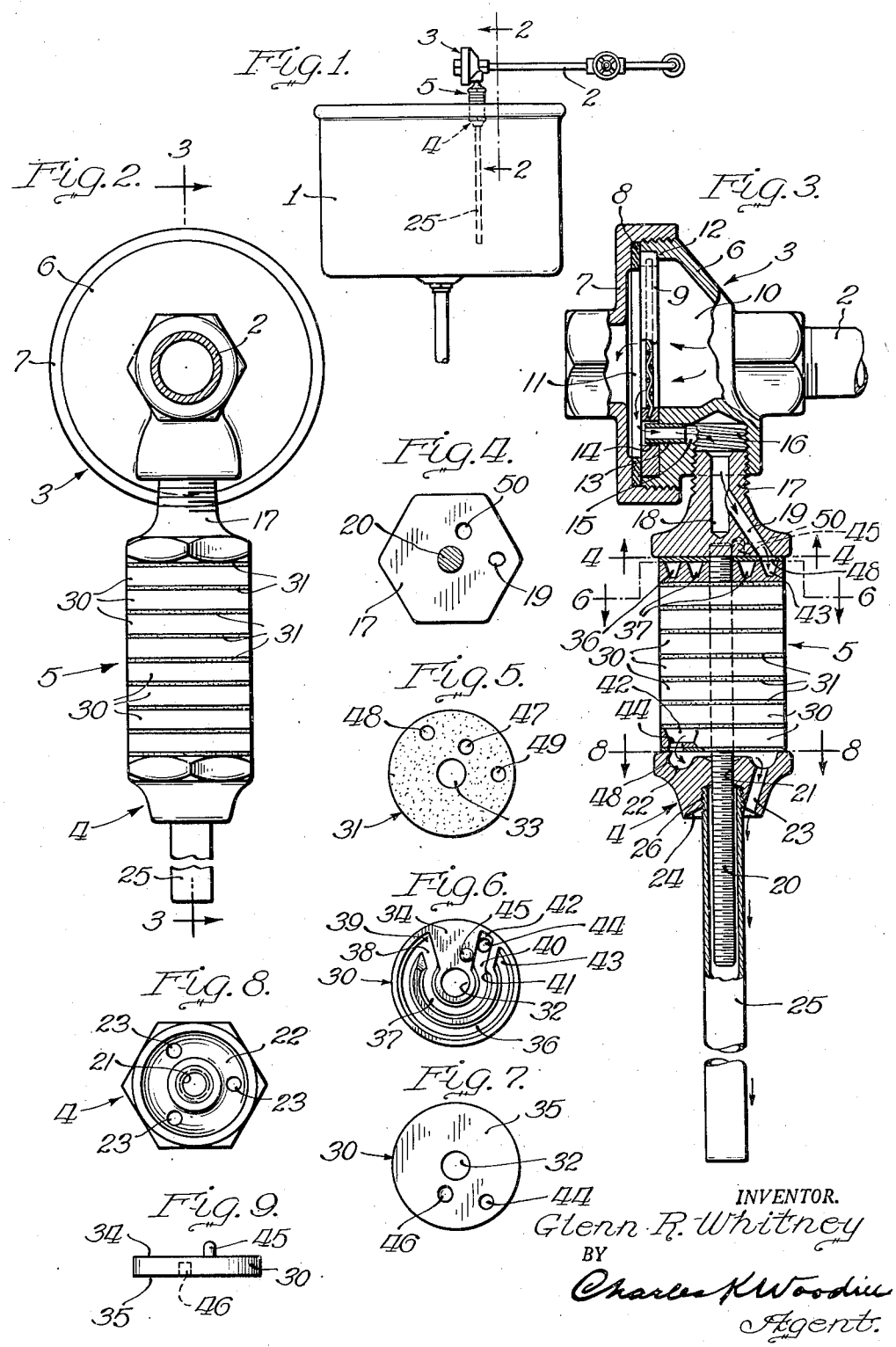
INVENTOR.
Glenn R. Whitney
BY
Charles K. Woodin
Agent.

Patented Sept. 13, 1949

2,481,705

UNITED STATES PATENT OFFICE 2,481,705

FLOW REGULATOR

Glenn R. Whitney, Chicago, Ill.

Application October 22, 1945, Serial No. 623,749

8 Claims. (Cl. 138—42)

This invention relates to a fluid flow regulator that may be employed for regulating the rate of flow of fluid between a pressure supply point and fluid discharge point. More particularly the invention relates to a regulator adapted for installations in connection with various flush boxes that are used in toilets.

One of the main objects of this invention is to produce a regulator wherein the fluid passageways are of sufficient size to eliminate clogging or the building up of restrictive sediment within any one of the passageways under normal conditions of operation. Thus, when an installation is made incorporating a regulator of the type herein disclosed, it is possible to guarantee a definite rate of flow over an unlimited period of operation providing a dependable regulator. This also cuts down maintenance cost and eliminates part replacements which are particularly costly in large installations using a plurality of such regulators. Heretofore it has been the practice to use orifice regulators and such have proven unsatisfactory for the reason that wire drawing occurs and leads to wear and enlargement of the particular orifice openings thereby definitely destroying the predetermined rate of flow of fluids through a given regulator of the orifice type.

Another object of the present invention is to provide a regulator having a plurality of similar elements each of which provide tortuous fluid passageways for frictionally resisting fluid flow to a given amount. In this manner it is possible to assemble a regulator with any number of such fluid restricting elements until a definite discharge of fluid is obtained at a given rate thereby providing a single inlet and outlet means carrying the regulator elements therebetween in such a number as to produce the proper fluid flow.

Another object of the present invention is to provide a further safeguard means to insure continued and efficient operation comprising a screen unit wherein the area of the openings therein are all equal to or slightly less than the smallest opening in any portion of the fluid passageways through the regulator. In this manner any dirt or other obstruction which is capable of entering the screen will also be capable of passing directly through the regulator and outwardly therefrom together with the discharging fluid without lodging within any portion of the regulator.

Another object of the present invention is to provide a regulator wherein the fluid control is such as to eliminate irritating and objectionable noises aside from a faint hush flow barely noticeable under ordinary conditions. Practically all of the regulators now in use make considerable noise by reason of fluid churning, bubbling, and "wire drawings," etc., are all objectionable and not indicative to good operation.

All other objects and advantages shall hereinafter be referred to in the following detailed description of a preferred embodiment of the present flow regulator, such description having reference to the accompanying drawings forming a part of this specification.

In the drawings:

Fig. 1 is a general view illustrating the use of a fluid regulator in a typical flush box installation;

Fig. 2 is an enlarged side elevational view of the flow regulator substantially as seen along the line 2—2 in Fig. 1;

Fig. 3 is a longitudinal sectional view through the flow regulator taken substantially along the line 3—3 in Fig. 2;

Fig. 4 is a face view of a portion of the inlet means substantially as seen along the line 4—4 in Fig. 3;

Fig. 5 is a face view of one of the gaskets employed between the successive flow controlling elements of the regulator;

Fig. 6 is a plan view of one of the regulator discs as viewed substantially along the line 6—6 in Fig. 3 but with such disc removed therefrom;

Fig. 7 is a face view of the reverse side of the disc illustrated in Fig. 6;

Fig. 8 is a view of a part of the distributor outlet means of the regulator substantially as seen along the line 8—8 in Fig. 3; and Fig. 9 is an edge view of a disc as illustrated in Figs. 6 and 7.

Fig. 1 illustrates the use of the flow regulator in connection with a typical installation having a flush box I wherein the regulator is adapted for controlling the flow of water from a fluid supply line 2 into such flush box I. The latter is equipped with automatic flushing mechanism of any conventional type which need not be herein described inasmuch as such does not form a part of the present invention.

Referring more particularly to Figs. 2 and 3, the regulator comprises a fluid inlet mechanism 3 and a fluid distributor outlet mechanism 4 having the flow regulating mechanism 5 disposed therebetween. The fluid inlet mechanism 3 comprises a casing 6 secured to the water supply line 2, such casing 6 having a cover 7 threaded thereon for clamping a gasket 8 between the casing 6 and cover 7 and against a removable screen 9 positioned in the path of the water flow in the inlet mechanism. Thus, in effect, the fluid inlet mechanism 3 provides two chambers 10 and 11 disposed at the intake and outlet sides of the screen 9 respectively.

The screen 9 is located in proper angular relationship with respect to the axial centerline of the intake head and with respect to the screen seat 12 of the casing by means of a projecting tube 13 coacting with the screen opening 14, such tube being held in fixed position within the bore 15 in the casing 6 which bore communicates with a threaded bore 16. The fluid inlet mechanism terminates in a nipple in the form of a threaded cap 17 that is provided with a central bore 18 communicating with a diagonal bore 19 for the purpose of transmitting the flow of the inlet fluid through the described mechanisms down to the plane of the outer face of the cap 17 substantially in the manner illustrated in Figs. 3 and 4.

A relatively long threaded stem 20 is secured to the cap 17 and depends from the lower face of the cap as illustrated in Fig. 3 for the reception of the fluid outlet mechanism 4. The latter distributor mechanism 4 is in the form of a threaded nut which provides a clamping means to tightly dispose the flow regulating mechanism 5 between the upper face thereof and the lower face of the cap 17. This fluid outlet mechanism is internally threaded at 21 for threaded engagement with stem 20 and has an upper annular recess 22 encircling the stem 20. A plurality of diagonally drilled discharge ducts 23 lead from the recess 22 and terminate in a predetermined position at concentrically positioned points disposed about the concave underside 24 of the fluid outlet mechanism.

A depending fluid guide tube 25 is threaded into an enlarged bore 26 arranged concentrically with respect to the stem 20 which depends from the face of the cap 17 through the regulating mechanism 5 and downwardly into guide tube 25. Attention is also directed to the fact that the bores 23 provide discharge ducts that terminate with their external openings in tangential engagement with the external peripheral surface of the tube 25, the reason for which shall hereinafter be explained.

The flow regulating mechanism 5 comprises a plurality of discs 30 separated by a plurality of gaskets 31, the discs being provided with central openings 32 as shown in Figs. 6 and 7, while the gaskets are provided with central openings 33 as illustrated in Fig. 5. Openings 32 and 33, therefore, permit the assembly of a plurality of gaskets and a plurality of discs 30 such as illustrated in Figs. 2 and 3 providing a stack or bank of discs and gaskets that may all be placed upon the stem 20 in superimposed relationship to be tightly clamped between the cap 17 and the fluid distributor discharge mechanism 4 in the relationship illustrated in Figs. 2 and 3. Stem 20 has been made long enough to accommodate as many discs and gaskets as are needed under most circumstances.

Each of the discs 30 are provided with parallel flat faces 34 and 35 as seen in Fig. 9 and in Figs. 6 and 7. The face 34 is provided with a plurality of concentrically located inlet and outlet channels such as 36 and 37, respectively, which are connected at 38 in a manner to produce a relatively sharp reversing current flow zone 39. A further restricted flow zone 40 is produced by means of a vertical ridge 41 at the point where the outlet channel turns toward the outlet point 42. The inlet point of the disc 30 is indicated at 43 at the extreme dead end portion of the inlet channel 36 so that the fluid entering at the point 43 must pass concentrically through the inlet channel 36 reversing at the churning or eddy current point 39 through the connecting passage 38 into the central concentric discharge channel 37 through the ridged portion of the latter channel indicated at 40 and toward the dead end portion of the discharge channel 42. A communicating passageway is provided in the form of a duct 44 comprising in this case a vertically drilled bore which passes from the dead end 42 of the discharge channel 37 outwardly through the face 35 of the disc 30 as shown in Fig. 7. Obviously, any number of labyrinth passageways may be provided in the face 34 of the disc 30 to produce a tortuous fluid passageway also including one or more channel leads of the kind described and to further frictionally or otherwise retard or slow down the free flow of the fluid current passing through such discs.

Attention is directed to the fact that the intake point 43 and the discharge point indicated by the duct 44 are angularly displaced as viewed in Fig. 6. For this reason it is necessary to provide a registering means for lining up each of the succeeding discs or fluid conducting members in a definite predetermined angular relationship to always insure a free and continuous flow of fluid through the duct 44 into the dead end intake point 43 of the next succeeding disc. This has been accomplished by providing a registering pin 45 in the face 34 of the disc 30. This pin is adapted to register within a prelocated opening 46 as shown in Figs. 7 and 9. The angular positions of the pin 45 and opening 46 in each disc are such, that when the pins of each disc engage within the coacting openings in each of the adjacent discs, the communicating duct 44 of each successive disc will be angularly displaced the proper amount to locate the communicating ducts 44 above the dead end location 43 of each successive intake channel 36 of the discs. Obviously, the gaskets 31 must also be provided with suitable openings to permit the registry of the discs in the manner explained and also to permit free fluid flow from one disc to the next while functioning in the capacity of sealing the adjacent faces of the discs against fluid leakage laterally out of the flow regulator.

Therefore, referring to Fig. 5, each of the gaskets 31 is provided with openings 47 through which the pins 45 may be extended, and also with two symmetrically located openings 48 and 49 are provided in equal angular positions with respect to the radial line through the opening 47 of the disc. By locating two openings such as 48 and 49 it is possible to assemble the gaskets 31 between the discs with either face of the gaskets usable in either direction to eliminate all possibilities of wrongly assembling such gaskets with respect to the discs. In other words, the discs 31 may be assembled with one face or the other thereof toward the head end of the device bringing either of the openings 48 or 49 in direct line with the communicating duct 44 of the adjacent disc to permit transmission of fluid from such opening 44 through the gasket opening into the dead end pocket 43 of the intake channel 36 of the next succeeding disc.

Therefore, by assembling a bank of a selected number of discs and sealing gaskets of the kind described a definite frictional resistance is built up to counteract fluid flow augmented by a predetermined tortuous interference with such flow.

As the fluid is discharged from the last disc of the stack or bank, such fluid is directly emptied into the annular ring 22 of the fluid outlet mechanism, the fluid there distributing itself about such annular recess for discharge through the plurality of openings 23 and downwardly to the concave underside 24 of the fluid outlet mechanism 4. Through the use of the annular recess 22 in the mechanism 4 it is immaterial as to what angular position the last disc and gasket occupy as is obvious from the drawings.

However, another feature of the present invention is to establish a prelocating means between the threaded cap 17 and the first fluid conducting member or disc 30 which is located immediately adjacent the face of the cap 17. This is accomplished by providing a drilled opening 50, see Figs. 3 and 4, in the bottom face of the cap 17, which opening is prelocated and adapted for receiving the registering pin 45 of the adjacent disc 30 also accommodating a gasket such as 31 with the pin 45 extending through the gasket opening 47 into the opening 50 in the under face of the cap 17.

Referring back to the fluid outlet mechanism 4, it is now understood that the fluid discharge from the entire device takes place at the zone or points where the discharge bores 23 are disposed adjacent the outer peripheral surface of the tube 25. With this arrangement water or other fluid discharged from the device will now flow downwardly along the surface of the tube 25 to the point of remote discharge from the device. The reason for arranging a discharge of this kind is to prevent any back syphoning which is made possible by the fact that the discharge water flows over an open surface and is not confined to be retracted or sucked up as in the case of an enclosed tube or other confined water channel thereby counteracting back syphoning which has always been objectionable in plumbing installations of all kinds and definitely barred by the health authorities.

As a brief summary, it is seen that the water flow through the regulator of the kind herein disclosed and described may best be followed with reference to Fig. 3. The water enters chamber 10 in the casing 6 from the supply pipe 2 passes through the screen 9 into chamber 11 downwardly into the tube 13, through the bore 15 into the threaded cavity 16 passing through the bores 18 and 19 into the first disc 30 of the stack or bank 5. The flow of fluid through each disc then takes place from point 43 to the sharp reversal point 39, through the passageway 38 into the channel 37 and about the latter past the ridged point 41 and into and out of the fluid discharge communicating duct 44. This same flow is then repeated through the next succeeding discs and obviously such flow is continued by transmission through the gaskets 31 through either one of the openings 48 and 49, whichever happens to line up with the particular opening 44 disposed adjacent thereto. Therefore, after the fluid has passed through all of the tortuous and elongated channels of each of the discs, the fluid finally enters the annular recess 22 of the fluid outlet mechanism 4 and drains through the openings 23 all of which are diverging inwardly toward the surface of the fluid guide tube 25, and the latter catches the fluid thereon and directs the same over its surface downwardly into the receptacle reservoir into which the water is being remotely directed under a definite predetermined rate of flow.

Attention is also directed to the screen 9 which is composed of wire mesh or other perforated means having all of its openings of a size equal to or slightly less than the area size of any one of the passageways, ducts, or other water flow areas through the device so as to permit the passage of any foreign matter directly through the device which is able to enter and pass through the openings of the screen 9. This eliminates all clogging or interference with the efficient and accurate operation of the device as shown and described. The number of screen openings are also plentiful to keep the regulator at full flow and with long life operation.

Other changes and modifications are contemplated as well as the substitution of mechanical equivalents. Such changes and substitutions shall be governed by the breadth and scope of the appended claims.

What I claim is:

1. A flow regulator comprising a fluid inlet means terminating in a flat face, a fluid outlet means having a recessed face, a rod to adjustably locate the faces of said inlet and outlet means in a predetermined spaced relation, and a plurality of fluid conducting members carried on said rod and connected between the faces of said means, each member having a labyrinth passageway therein, and communicating means to connect each passageway with the passageway in the next succeeding member, all of said members collectively providing a tortuous flow restricting channel therethrough to provide a predetermined rate of fluid flow between said inlet and outlet means, and coacting registering means carried by each of said members and coacting with said rod to position the communicating means of each adjacent member for continuous fluid transmission through all of said members.

2. A flow regulator comprising a fluid inlet means, a fluid outlet means, and a plurality of fluid conducting members connected between said means, each member having a labyrinth passageway therein, and communicating means to connect each passageway with the passageway in the next succeeding member, all of said members collectively providing a tortuous flow restricting channel therethrough to provide a predetermined rate of fluid flow between said inlet and outlet means, coacting registering means carried by each of said members to position the communicating means of the adjacent member for continuous fluid transmission through all of said members, and further cooperating registering means carried by said inlet means for coaction with the registering means of the next adjacent member to position all of said members in definite relation with respect to said inlet and outlet means.

3. A flow regulator comprising fluid inlet means, a threaded fluid outlet means, and a plurality of fluid conducting discs disposed between the aforesaid means and comprising the body of the fluid conducting portion of said regulator, said discs each having a fluid passageway therein together with a duct to connect the passageways of adjacent discs, and holding means comprising a threaded rod connected between said inlet and outlet means for positioning said discs in superimposed relation between the latter means, said threaded outlet means coacting with said threaded rod to clamp said discs between said inlet and outlet means.

4. A flow regulator comprising fluid inlet means, fluid outlet means, and a plurality of fluid conducting apertured discs disposed between the aforesaid means, said discs each having a fluid passageway therein together with a duct to connect the passageways of adjacent discs, and holding means extending between said inlet and outlet means and through said disc apertures for positioning said discs in superimposed relation between the latter means, said discs each having cooperative registering units to locate each successive disc in predetermined angular position with respect to said holding means to locate the ducts in the said discs in continuous fluid flow relationship to the passageways in each succeeding disc.

5. A flow regulator comprising fluid inlet means, fluid outlet means, and a plurality of fluid conducting discs disposed between the aforesaid means, said discs each having tortuous fluid passageways therein to frictionally retrict fluid flow and having connecting ducts joining said passageways to collectively restrict the rate of fluid flow between said inlet and outlet means, said outlet means having a plurality of fluid ducts therein to divert fluid from said discs to a predetermined external point, and fluid guide means connected with said point to direct said fluid along the exterior surface thereof to a remote discharge point.

6. A flow regulator comprising fluid inlet means, fluid outlet means, and a plurality of fluid conducting apertured members interposed in stacked relation between said means with each outer stack member in sealing contact with said means, each member having connected inlet and outlet fluid channels, and all of said channels of said members collectively providing tortuous means to restrict the rate of fluid flow through said members, gaskets between said fluid conducting members, and retaining means connecting said inlet and outlet means and passing through the apertures of said members to position said fluid conducting members in aligned relation directly between said inlet and outlet members, said retaining means and one of the aforesaid inlet or outlet means having cooperative means to clamp said members and gaskets tightly together and in direct operative contact with said inlet and outlet means to prevent fluid leaks.

7. In a flow regulator, inlet means, outlet means, and a fluid conducting body comprising a plurality of identical flow restricting units extending directly between said means and each comprising a disc, connected concentric fluid channels in each disc, said channels being arranged to obtain at least one sharp reversal in the path of the fluid flow therethrough, said discs having a communicating duct to connect one terminal end of said disc channels with another terminal end in the channels in the next adjacent disc, and a locating means connected with each disc to engage coacting means on each adjacent disc to hold each next adjacent disc in a predetermined position for fluid transmission through said communicating ducts between adjacent discs.

8. In a flow regulator, a fixture having an inlet duct, a fixture having an outlet duct, a rod connecting said fixtures, one of the latter and said rod having coacting means to adjustably dispose said fixtures in predetermined spaced relation, and a fluid carrying body interposed directly between said fixtures comprising a plurality of fluid flow restricting identical discs having channels with ducts to connect each adjacent disc for continuous fluid passage, said discs each having an aperture to coact with said rod to position said disc in stacked relation between said fixtures, and identical registering means on each disc to coact with the next adjacent disc to position said discs in angular relation with respect to said rod for continuous fluid communication through all of said discs and between said fixtures.

GLENN R. WHITNEY.

REFERENCES CITED

The following references are of record in the file of this patent:

UNITED STATES PATENTS

| Number | Name | Date |
|---|---|---|
| 774,490 | Paine | Nov. 8, 1904 |
| 852,701 | Bryant | May 7, 1907 |
| 1,883,273 | Zerk | Oct. 18, 1932 |
| 1,899,251 | Zerk | Feb. 28, 1933 |
| 2,021,079 | Mittendorf | Nov. 12, 1935 |
| 2,118,290 | Black | May 24, 1938 |
| 2,118,295 | Crawford | May 24, 1938 |
| 2,229,441 | Carlson | Jan. 21, 1941 |